United States Patent
Bragin et al.

(10) Patent No.: US 7,804,879 B2
(45) Date of Patent: Sep. 28, 2010

(54) GAS LASER ELECTRODES SHAPED IN THE LONGITUDINAL AXIS

(75) Inventors: Igor Bragin, Goettingen (DE); Vadim Berger, Goetingen (DE)

(73) Assignee: Coherent, Inc., Santa Clara, CA (US)

( * ) Notice: Subject to any disclaimer, the term of this patent is extended or adjusted under 35 U.S.C. 154(b) by 101 days.

(21) Appl. No.: 11/804,795

(22) Filed: May 21, 2007

(65) Prior Publication Data

US 2007/0274363 A1    Nov. 29, 2007

Related U.S. Application Data

(60) Provisional application No. 60/802,855, filed on May 23, 2006.

(51) Int. Cl.
*H01S 3/097* (2006.01)

(52) U.S. Cl. .................. 372/87; 372/29.013; 372/38.05; 372/81

(58) Field of Classification Search ............ 372/29.013, 372/38.05, 81–88
See application file for complete search history.

(56) References Cited

U.S. PATENT DOCUMENTS

| 4,574,380 | A | * | 3/1986 | Nam | 372/87 |
| 4,698,551 | A | * | 10/1987 | Hoag | 313/619 |
| 6,052,402 | A | * | 4/2000 | Murray et al. | 372/87 |
| 6,560,263 | B1 | * | 5/2003 | Morton et al. | 372/87 |
| 6,570,901 | B2 | | 5/2003 | Stamm et al. | 372/58 |
| 7,079,565 | B2 | * | 7/2006 | Bragin et al. | 372/87 |
| 2004/0022292 | A1 | * | 2/2004 | Morton et al. | 372/55 |
| 2005/0002427 | A1 | | 1/2005 | Bragin et al. | 372/35 |
| 2005/0058172 | A1 | | 3/2005 | Paetzel et al. | 372/55 |

* cited by examiner

*Primary Examiner*—Tod T Van Roy
(74) *Attorney, Agent, or Firm*—Morrison & Foerster LLP

(57) ABSTRACT

A gas discharge laser includes elongated discharge electrodes having an active surface width that varies along the length of the resonator. In one example each of the electrodes is formed by a row of pins having a circular active surface. The pins are diametrically aligned with the active surfaces generally coplanar.

6 Claims, 4 Drawing Sheets

|  |  | Far Field long axis | Far Field short axis | Near Field long axis | Near Field short axis |
| --- | --- | --- | --- | --- | --- |
|  |  | mrad | mrad | mm | mm |
| Standard 4mm Electrodes | FWHM | 2.20 | 0.69 | 8.58 | 4.12 |
| Modified 4mm Electrodes | FWHM | 1.03 | 1.18 | 9.55 | 3.75 |
| Standard 4mm Electrodes | 1/e^2 | 5.77 | 1.53 | 12.04 | 6.06 |
| Modified 4mm Electrodes | 1/e^2 | 1.79 | 1.87 | 10.18 | 6.48 |
FIG. 7
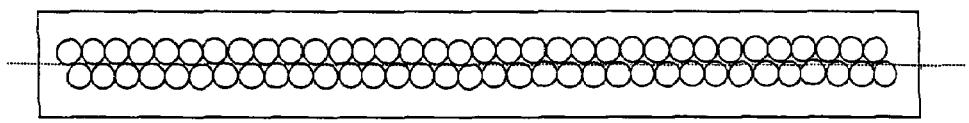
FIG. 8
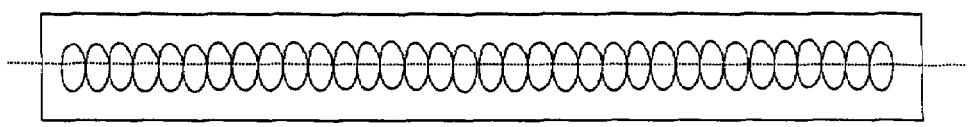
FIG. 9
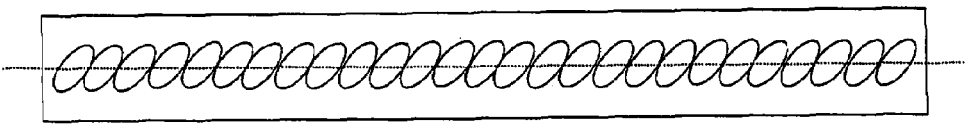
FIG. 10

GAS LASER ELECTRODES SHAPED IN THE LONGITUDINAL AXIS

PRIORITY CLAIM

This application claims priority from U.S. Provisional Application No. 60/802,855, filed on May 23, 2006, by Berger et al. and titled "Gas Laser Electrodes Shaped in the Longitudinal Axis." Provisional Application No. 60/802,855 is hereby incorporated herein by reference in its entirety.

TECHNICAL FIELD OF THE INVENTION

The present invention relates to gas discharge lasers and, in particular, to a laser design in which the active surfaces of the laser electrode assemblies have an effective width that varies longitudinally in a predetermined pattern.

DISCUSSION OF BACKGROUND ART

FIG. 1 shows a conventional gas discharge laser design. The active medium in the FIG. 1 gas discharge laser 100 occupies the elongated area between two resonator mirrors; a high reflector mirror 102 and an output coupler mirror 104. The exciting of the active medium is performed by a gas discharge. The electrical circuit of the gas discharge includes two metal electrodes 106, 108 contacting with the laser gas medium and are placed parallel to each other. The length of the electrodes 106, 108 defines the length of the laser medium, while the separation, width and surface shape of the electrodes 106, 108 provide the proper cross section and properties of the laser beam.

Regular convex is the most popular electrode design. As mentioned above, the active surface shape and separation of the electrodes provide the required gas discharge dimensions. FIG. 2 shows the typical convex electrode arrangement; the well-known laser chamber containing gas in which the discharge is struck is not shown in FIG. 2 for convenience of illustration. As is well known, laser light travels along the longitudinal axis of the resonator.

FIG. 3 shows step electrodes, that is, a modification of the FIG. 2 regular convex electrodes with a relatively sharp step and a flat rectangular smooth surface that limits the gas discharge width.

The general feature of both the FIG. 2 regular convex electrode design and the FIG. 3 step electrode design is the uniform laser beam that each provides over the length of the electrodes.

As discussed above, the electrical discharge and electrode configuration of a gas discharge laser strongly defines the size and uniformity of the laser beam. Proper operation of pulsed gas lasers, e.g. excimer (ArF, KrF, XeCl), demands relatively strong pumping intensities (on the order of several MWt/cm$^3$). Only such a strong excitation allows reasonable laser efficiency and pulse-to-pulse laser stability to be reached.

This strong excitation level has disadvantages. The relatively small discharge volume results in a high output laser light energy on the optics/windows of the system, limiting their lifetime. Additionally, the conductivity of the plasmas in the active phase is quite low; obtaining sufficient laser efficiency and good matching between the impedance of the gas discharge plasmas and the electrical circuit demands discharges with the highest ratio of the electrodes' gap and discharge width. However, the best laser beam shape for many applications is rectangular with relatively close beam width and height (if not quadratic). Also, the divergence of the light beam should not differ too much in both directions.

In view of the foregoing, it would be highly desirable to have available a laser discharge configuration that would allow a reduction in the volume of the discharge without significant change in length and in the laser beam cross section.

SUMMARY OF THE INVENTION

A laser in accordance with the present invention comprises a laser chamber containing a lasing gas. The laser includes a laser resonator having a longitudinal axis extending through the lasing gas in the laser chamber and first and second elongated electrode assemblies having active surfaces that are arranged face-to-face and parallel to each other and extending longitudinally on opposite sides of the longitudinal axis of the resonator. The active surfaces of the electrode assemblies have an effective width that varies longitudinally in a predetermined pattern.

In an embodiment of the invention, each of the electrode assemblies includes a plurality of pins having a circular active surface. The pins are aligned diametrically in close proximity to each other, with active surfaces thereof being coplanar except near the ends of the electrodes. This provides an effective electrode surface that varies periodically in width from the diameter of the pins to zero along the length of the electrodes.

The features and advantages of the various aspects of the present invention will be more fully understood and appreciated upon consideration of the following detailed description of the invention and the accompanying drawings, which set forth illustrative embodiments in which the concepts of the invention are utilized.

BRIEF DESCRIPTION OF THE DRAWINGS

FIG. 7 provides a table comparing the conventional step electrode design and the FIG. 4 pin electrode design.

FIGS. 8-13 illustrate alternate embodiments of an electrode design in accordance with the concepts of the present invention.

DETAILED DESCRIPTION OF THE INVENTION

As discussed above, a gas discharge laser includes electrode assemblies that have active surfaces that are arranged face-to-face and parallel to each other and that extend longitudinally on opposite sides of the longitudinal axis of the laser resonator. In accordance with the present invention, the active surfaces of the electrode assemblies have any effective width that varies longitudinally in a predetermined pattern. That is, in accordance with the invention, the electrodes have a variable active surface width over the length of the electrodes.

Figure 4:
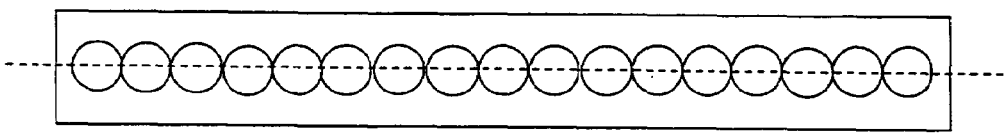
FIG. 4 shows an embodiment of an electrode design in accordance with the present invention.

In accordance with one embodiment of the present invention, shown in FIG. 4, the electrodes consist of separate circular pins that are positioned close to each other, for example, at a distance of less than about 0.5 mm from each other. The discharge width then varies from about pin diameter to nearly zero. The top areas of the pins have a special profile, e.g. rounded edges, providing the smoothing of the electrical fields near the edges. The active surfaces of the pins are generally coplanar, except near the ends of the electrodes.

Figure 1:
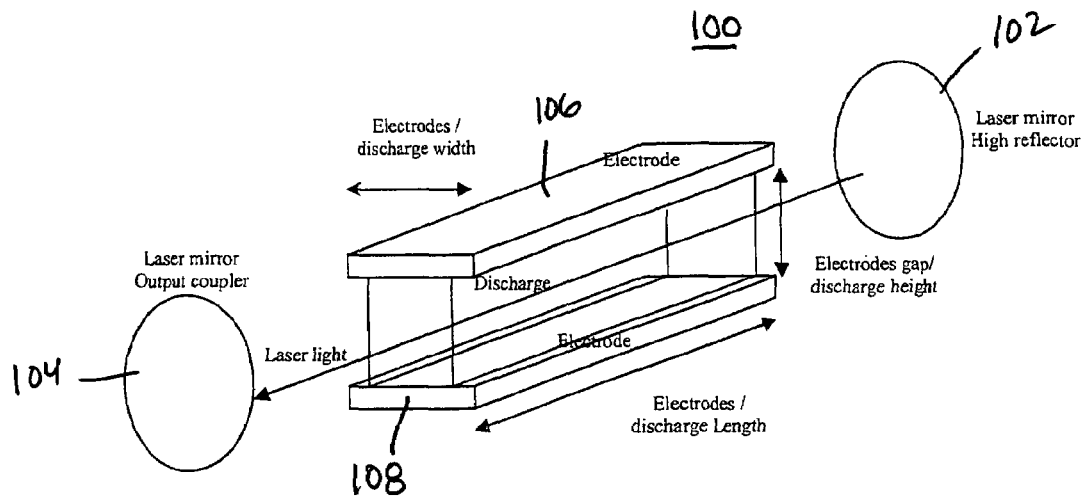
FIG. 1 shows elements of a conventional gas discharge laser design.
Figure 2:
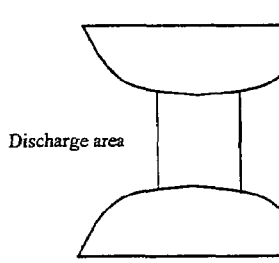
FIG. 2 is a cross section drawing illustrating conventional regular convex electrodes for a gas discharge laser.
Figure 3:
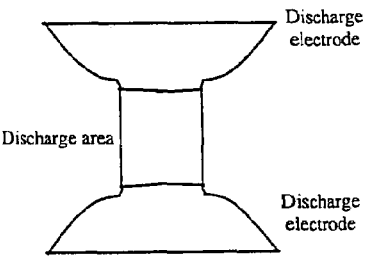
FIG. 3 is a cross section drawing illustrating conventional step electrodes for a gas discharge laser.
Figure 5A:
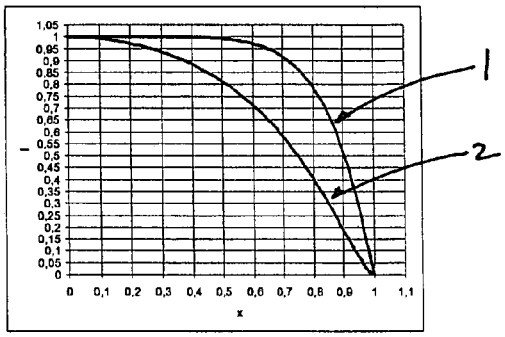
FIGS. 5A and 5B show the dependence of discharge pump density on the radial coordinate from the center of the pin in the FIG. 4 electrode design and the expected laser beam profile I, the case of relatively uniform pumping and the case when pumping is not uniform, respectively.
Figure 5B:
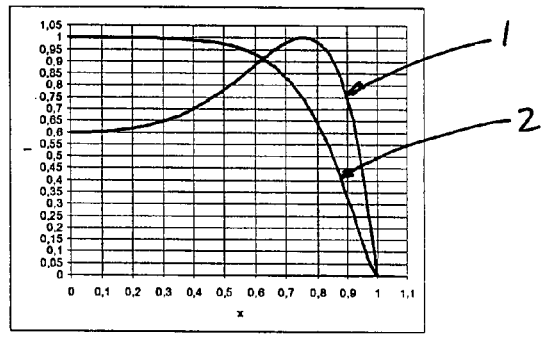

The typical problem of the standard electrodes discussed above in conjunction with FIGS. 1-3 is the possible splitting of the beam profile due to the strong electrical fields near the sharp edges. The circular pin electrode design provided by the present invention improves this situation and smoothes the laser beam profile, even in the case of the stronger discharge near the edge of the pins, as shown in the FIGS. 5A and 5B graphs. In the FIGS. 5A and 5B graphs, the line 1 curve shows the dependence of the discharge pump density on the radial coordinate from the center of the pin; the line 2 curve shows the expected laser beam profile. FIG. 5A shows the case of relatively uniform pumping. FIG. 5B shows a relatively uniform beam profile in the case when the pumping is strongly not uniform.

Figure 6:
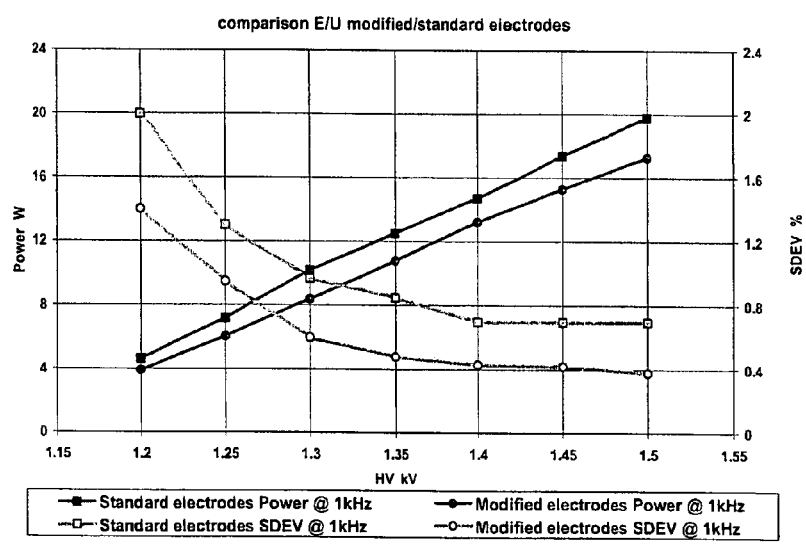
FIG. 6 shows a comparison of the performance of a conventional step electrode and the FIG. 4 pin electrode design.

FIG. 6 provides a comparison of the performance of a conventional step electrode design (FIG. 3) and a circular pin electrode design in accordance with the invention for the same electrode length and gap. The pin diameter is equal to the width of the step middle area. The total electrode length in each case is 478 mm (the preferred range of suitable electrode length is between about 200-1200 mm). It can be seen that, for the pin electrode design, efficiency is somewhat less and stability is slightly better than the convention design. The energy possible could be compensated by further optimization of the gas composition, laser resonator and electrical pumping conditions.

From the FIG. 7 table, it can be seen that the near field beam profiles for the two designs do not differ significantly. The beam profile for the pin electrodes is slightly more narrow and more uniformly filled. Far field (divergence) changes significantly. For the pin electrode, horizontal divergence is somewhat higher than for the standard electrodes and somewhat less in the vertical direction, so that the divergence in both directions is similar.

FIGS. 8-13 provide a top view of alternate electrode designs in accordance with the concepts of the invention. It is believed that a similar effect as that obtained from the pin electrode design discussed above can be achieved with these alternate designs which are based upon the same inventive concept: different discharge width over the length of the electrodes.

FIG. 8 shows an electrode design that utilizes a multiple rows of round pins.

FIGS. 9 and 10 show electrode designs that utilizes rows of pins that are not round, e.g. oval in FIG. 9 and "slanted" oval in FIG. 10

Figure 11:
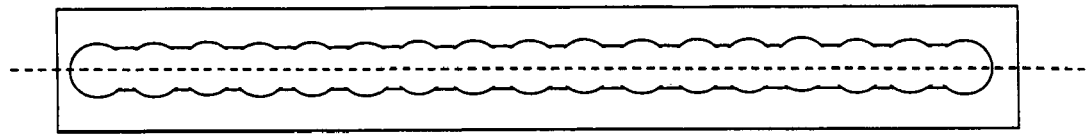
Figure 12:
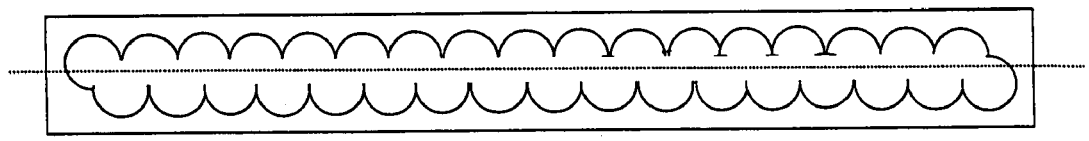

FIGS. 11 and 12 show electrode designs having a continuous area with a complicated border.

Figure 13:
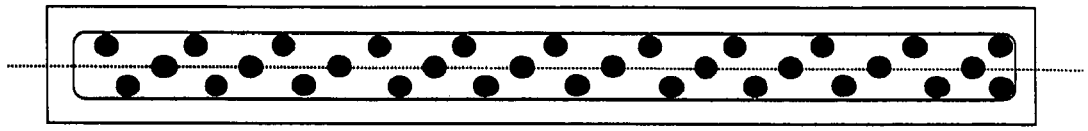

FIG. 13 shows an electrode design wherein the longitudinal variation of the effective surface area width is achieved by means of the inner deep areas or the holes (shown in black in FIG. 13) in an otherwise rectangular electrode.

Of course, those skilled in the art will appreciate that any combination of the above-disclosed designs, and/or modifications thereof, including different electrode designs in the same pair, will achieve the desired result and are considered to be within the scope of the present invention.

In summary, the primary feature of an electrode design in accordance with the invention is non-uniformity of the electrode width structure along the longitudinal axis of the electrode. Such electrodes provide the gas discharge with the variable cross section (along the direction of the laser beam, i.e., the resonator axis). The use of such electrodes permits an increase in the intensity of the laser medium excitation (at the similar laser beam dimensions) and provides a means to modify the beam parameters (e.g., dimensions and divergence).

It should be understood that the particular embodiments of the invention described above have been provided by way of example and that other modifications may occur to a person skilled in the art without departing from the spirit and scope of the invention as expressed in the appended claims and their equivalents.

What is claimed is:

1. A laser, comprising:
    a laser chamber containing a lasing gas;
    a laser resonator having a longitudinal axis extending through the lasing gas in the laser chamber; and
    first and second elongated electrode assemblies with active surfaces thereof arranged face-to-face and parallel to each and extending longitudinally on opposite sides of the longitudinal axis of the resonator, the active surfaces defining the region of the electrodes where the laser discharge is created, the active surfaces being directly adjacent the discharge, the active surfaces of the electrode assemblies having a width extending along an axis perpendicular to the longitudinal axis and wherein the effective width of the active surfaces varies along the longitudinal axis in a substantially continuous uninterrupted manner and wherein there are no gaps in the active surfaces along the axis perpendicular to the width and wherein at least one of the electrode assemblies includes a plurality of pins having a circular active surface adjacent the discharge, the being pins aligned diametrically with each other along the length of the assembly such that the effective width of the active surface varies longitudinally periodically.

2. A laser as in claim 1, and wherein the active surface adjacent the discharge of at least one of the electrode assemblies comprises a repetitive pattern.

3. A laser, comprising:
    a laser chamber containing a lasing gas;
    a laser resonator having a longitudinal axis extending through the lasing gas in the laser chamber; and
    first and second elongated electrode assemblies with active surfaces thereof arranged face-to-face and parallel to each and extending longitudinally on opposite sides of the longitudinal axis of the resonator, the active surfaces defining the region of the electrodes where the laser discharge is created, the active surfaces being directly adjacent the discharge, the active surfaces of the electrode assemblies having a width extending along an axis perpendicular to the longitudinal axis and wherein the effective width of the active surfaces varies along the longitudinal axis in a substantially continuous uninterrupted manner and wherein there are no gaps in the active surfaces along the axis perpendicular to the width and wherein at least one of the electrode assemblies includes two rows of a plurality of pins having a circular active surface adjacent the discharge, the pins in each row aligned diametrically with each other along the length of the assembly such that the effective width of the active surface varies longitudinally periodically.

4. A laser, comprising:

a laser chamber containing a lasing gas;

a laser resonator having a longitudinal axis extending through the lasing gas in the laser chamber; and first and second elongated electrode assemblies with active surfaces thereof arranged face-to-face and parallel to each and extending longitudinally on opposite sides of the longitudinal axis of the resonator, the active surfaces defining the region of the electrodes where the laser discharge is created, the active surfaces being directly adjacent the discharge, the active surfaces of the electrode assemblies having a width extending along an axis perpendicular to the longitudinal axis and wherein the effective width of the active surfaces varies along the longitudinal axis in a substantially continuous uninterrupted manner and wherein there are no gaps in the active surfaces along the axis perpendicular to the width and wherein at least one of the electrode assemblies includes a plurality of oval pins having an oval shaped active surface adjacent the discharge arranged in a row along the length of the assembly such that the effective width of the active surface varies longitudinally periodically.

5. A laser as in claim 4, and wherein the longitudinal axis of each oval pin is aligned perpendicular to the longitudinal axis of the assembly.

6. A laser as in claim 4, and wherein the longitudinal axis of each oval pin is aligned at a non-perpendicular angle to the longitudinal axis of the assembly.

\* \* \* \* \*